United States Patent [19]

Larsen

[11] 4,292,838

[45] Oct. 6, 1981

[54] CALIPER GAUGE FOR THE MEASUREMENT OF SHEET MEMBERS OVER A WIDE RANGE OF THICKNESSES

[75] Inventor: Tor G. Larsen, Saratoga, Calif.

[73] Assignee: Measurex Corporation, Cupertino, Calif.

[21] Appl. No.: 97,394

[22] Filed: Nov. 26, 1979

[51] Int. Cl.³ .............................................. G01B 13/04
[52] U.S. Cl. .................................................... 73/37.7
[58] Field of Search ...................... 73/37.7, 37.6, 37.5; 33/DIG. 2

[56] References Cited

U.S. PATENT DOCUMENTS

| 2,982,124 | 5/1961 | Knobel | 73/37.7 |
| 3,321,838 | 5/1967 | Albertson, Jr. | 73/37.5 X |
| 3,610,024 | 10/1971 | Honjo et al. | 73/37.5 |
| 4,031,741 | 6/1977 | Schaming | 73/37.7 |

FOREIGN PATENT DOCUMENTS 286242 11/1970 U.S.S.R. ................................ 73/37.5

Primary Examiner—Gerald Goldberg
Assistant Examiner—Joseph W. Roskos
Attorney, Agent, or Firm—Ronald Yin; Hal Bohner

[57] ABSTRACT

In an apparatus for the measurement of the thickness of a sheet through the use of air bearings, the apparatus has a stationary housing, a member in the housing capable of being extended in a direction substantially perpendicular to the sheet, and a fluid ring bearing capable of directing fluid to impinge the member in a substantially omnidirection which is substantially perpendicular to the direction of extension of the member.

6 Claims, 4 Drawing Figures

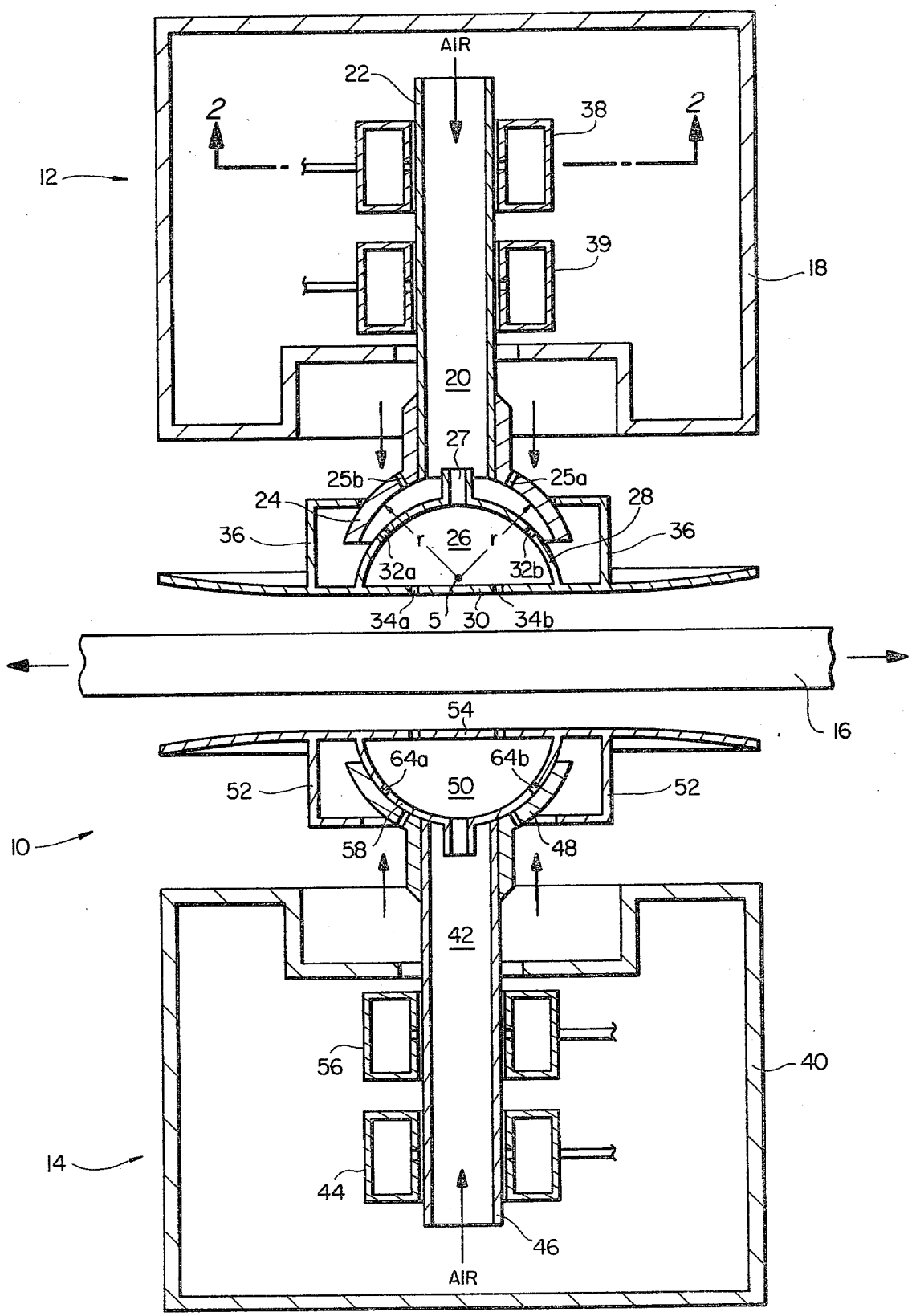
FIG_1

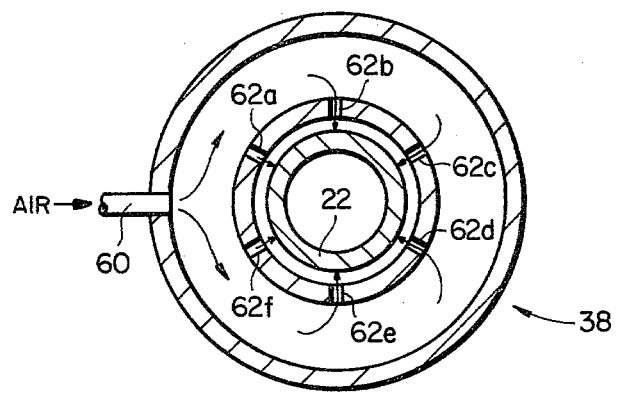
FIG_2
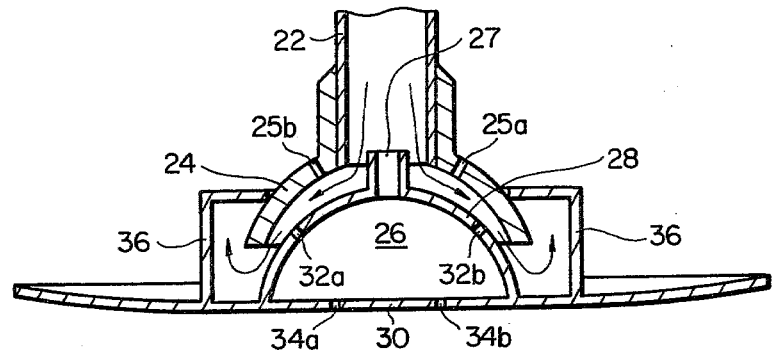
FIG_3
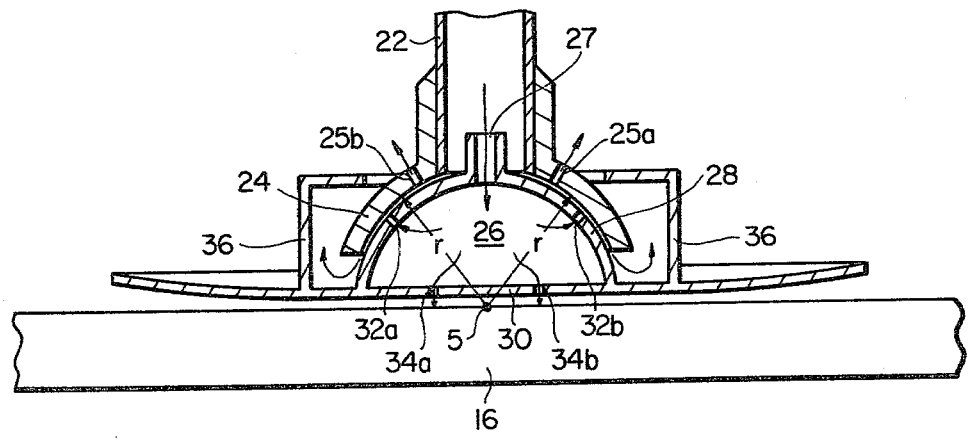
FIG_4

CALIPER GAUGE FOR THE MEASUREMENT OF SHEET MEMBERS OVER A WIDE RANGE OF THICKNESSES

BACKGROUND OF THE INVENTION

The present invention relates to an apparatus for the measurement of sheet members over a wide range of thickness values and more particularly, to an apparatus employing air bearing calipers and a method for using the apparatus.

Air bearing caliper gauges, used to measure the thickness of a sheet material, are well known in the art. See for example, U.S. Pat. Nos. 3,528,002 and 4,107,606. The teaching of the prior art, however, is that the transmitter and receiver are each placed in a housing located on opposite sides of the sheet. Each of the housings is maintained at a constant distance from the sheet through the action of the air bearing. The disadvantage of lifting each housing unit, with the weight of each housing unit associated therewith, precludes the use of the air bearing caliper gauge of the prior art on sheet members that have a wide range of thicknesses. Moreover, the problems of accuracy and stability caused by an apparatus to measure the thickness of the sheet over a wide range is not recognized and the solution is not taught by the prior art.

SUMMARY OF THE INVENTION

An apparatus for measuring the thickness of a sheet material having a portion of the apparatus to one side of the sheet and another portion to the other side of the sheet, wherein the improvement to either of the portions comprises a stationary housing, a member in the housing, capable of being extended in a direction substantially perpendicular to the sheet, and fluid means capable of directing fluid to impinge the member in a substantially omnidirection which is substantially perpendicular to the direction of extension of the member.

A method of operating an air bearing caliper gauge for measurement of the thickness of a sheet material wherein the gauge has a member adjustable to extend in a direction substantially perpendicular to the sheet, a body near one end of the member which is closer to the sheet, said body capable of pivoting about a point, and means for introducing air through said body to impinge the sheet, the method comprises extending the member in the direction of the sheet. Air is introduced through the body to impinge the sheet to lift the body from the sheet. The body is lifted from the sheet until the distance between the body and the sheet is such that the point of pivot is substantially at a surface of the sheet which is closer to the body.

BRIEF DESCRIPTION OF THE DRAWINGS

Fig. 1 is a cross-sectional side view of the apparatus of the present invention.

FIG. 2 is a cross-sectional view taken along the plane 2—2 of the apparatus of the present invention.

FIG. 3 is a cross-sectional detailed view of a part of the apparatus of the present invention, during the use of the apparatus.

FIG. 4 is another cross-sectional detailed view of a part of the apparatus of the present invention, during the use of the apparatus.

DETAILED DESCRIPTION OF THE DRAWINGS

Referring to FIG. 1, there is shown a cross-sectional side view of the apparatus 10 of the present invention. The apparatus 10 comprises an upper portion 12 to one side of the sheet material 16 and a lower portion 14 to the other side of the sheet 16. The upper portion 12 and the lower portion 14 are identical.

The upper portion 12 comprises a first housing 18. The first housing 18 is stationary with respect to the sheet 16. A first member 20 is in the first housing 18. The first member 20 is capable of being extended in a direction shown by the arrow, which is substantially perpendicular to the sheet 16. The first member 20 comprises a first hollow shaft 22. A first cup 24 is attached to one end of the first hollow shaft 22 which is closer to the sheet 16. The first cup 24 is connected to the first hollow shaft 22 with the concavity of the first cup 24 facing the sheet 16 and with the first cup 24 having a hole which is in line with the hollow portion of the first shaft 22. A plurality of first apertures 25 (shown as 25a and 25b) are in the first cup 24. Inside the first cup 24 is a first body 26. The first body 26 comprises a first dome 28 and a first flat cover 30 covering the first dome 28. An opening 27 in the first dome 28 is located near the apex. A plurality of outlets 32 (shown as 32a and 32b) are in the first dome 28 and a plurality of orifices 34 (shown as 34a and 34b) are in the first flat cover 30. First flange members 36 are attached to the first body 26 such that the first body 26 is inside the first cup 24 with the first body 26 capable of pivoting inside the first cup 24 about a pivot point 5. The first cup 24 has a radius of curvature shown as "r" and the pivot point 5 is located at the center of the radius of curvature. Near the other end of the first shaft 22 is a first air ring bearing 38. The first air ring bearing 38 provides a means of directing air to impinge the first shaft 22 from all directions, i.e., in a substantially omnidirection, which is substantially perpendicular to the direction of extension of the first shaft 22. In a preferred embodiment the first cup 24 and the first dome 28 of the first body 26 are concentrically shaped. Also in a preferred embodiment a second air ring bearing 39, identical to the first air ring bearing 38, surrounds the first shaft 22. The second air ring bearing 39 provides yet another source of fluid means to direct air at the first shaft 22 from all directions in a plane perpendicular to the direction of extension of the first shaft 22.

As discussed hereinabove the lower portion 14 of the apparatus 10 is identical to the upper portion 12. The lower portion 14 comprises a second housing 40, which is stationary with respect to the sheet 16. A second member 42 in the second housing 40 is identical to the first member 20 in the first housing 18, and is capable of being extended in a direction, shown by the arrow, which is substantially perpendicular to the sheet 16. In addition, the second member 42 is in substantial linear alignment with the first member 20. A third air ring bearing 44 is capable of directing air to impinge the second member 42 in a circular direction, similar to the first air ring bearing 38, i.e., a substantially omnidirection which is substantially perpendicular to the direction of extension of the second member 42. The second member 42 comprises a second hollow shaft 46, a second cup 48, a second body 50, and a second flange member 52, identical to the first hollow shaft 22, the first cup 24, the first body 26 and the first flange members 36, respectively. In addition, the second body 50 comprises a second dome 58 and a second flat cover 54, covering the second dome 58, identical to the first dome 28 and the first flat cover 30, respectively. In a preferred embodiment, the second cup 48 and the second dome 58 of the second body 50 are concentrically shaped. Also in a preferred embodiment, a fourth air ring bearing 56, identical to the second air ring bearing 39 surrounds the second shaft 46.

Referring now to FIG. 2 there is shown a portion of the first air ring bearing 38 in greater detail. The first air ring bearing 38 is a circularly shaped chamber which surrounds the first shaft 22. A first air inlet 60 permits air to enter into the first air ring bearing 38. A plurality of air outlets 62 (62a-62f) permit air to be expelled from the first air ring bearing 38 and to impinge the first shaft 22 from all sides in a plane which is substantially perpendicular to the direction of extension of the first shaft 22.

In a method of using the apparatus 10 of the present invention, the first member 20 is extended in the direction of the sheet 16. Air is introduced into the hollow shaft 22. As shown in FIG. 3, the flange members 36 permit the first body 26 to "dangle" from the first cup 24, providing a space between the first cup 24 and the first dome 28. The air introduced into the first hollow shaft 22 will pass substantially in the space between the first cup 24 and the first dome 28, as shown by the arrows. The air will then vent into the atmosphere. As the first member 22 is further extended until it nears the sheet 16 and then contacts the sheet 16, the first body 26 is lifted and is brought closer to the first cup 24, thereby closing the gap between the first dome 28 and the first cup 24. With the reduction in space between the first dome 28 and the first cup 24, air then enters into the first body 26 through the opening 27 at the apex of the first dome 28. Air in the first dome 28 is expelled through the orifices 34 in the first flat cover 30 and impinge the sheet 16. The expulsion of the air from the first body 26 lifts it from the sheet 16. The gap between the first body 26 and the sheet 16 is increased until the distance between the first body 26 and the sheet 16 is such that the point of pivot 5 which is at the center of the radius of curvature of the first cup 24, is substantially at a surface of the sheet 16 which is closer to the first body 26. The air pressure is regulated such that the forces are in equilibrium and the point of pivot 5 lies on a surface of the sheet 16 which is closer to the first body 26. Air in the first dome 28 also escapes from the first dome 28 via the outlets 32, and through the apertures 25 creating air bearing between the first dome 28 and the first cup 24. The air bearing, albeit a small one, between the first dome 28 and the first cup 24 enables the first dome 28 to pivot about the first cup 24, with little or no friction. The pivoting capability of the first body 26, and the fact that the point of pivot 5 lies on a surface of the sheet 16 which is closer to the first body 26, means that the first body 26 is able to move with the sheet in the event of any variation in the sheet thickness or any variation in the angle at which the sheet 16 passes between the upper portion 12 and the lower portion 14. Similarly, the second body 50 will be at a distance such that the point of pivot of the second body 50 will lie on a surface of the sheet 16 which is closer to the second body 50.

It should be appreciated that it is not necessary for the first body 26 to contact the sheet 16 in the method of the present invention. In the method described hereinabove, and as shown in FIGS. 3 and 4, the first body 26 is initially "dangled" and is separated from the first cup 24 due to the fact that the first member 20 is located above the sheet 16 and the action of the gravity causes this position. It should be appreciated that in the second member 42, shown in FIG. 1 as being beneath the sheet 16, the action of the gravity will cause the second body 50 to be in contact with the second cup 48. Therefore, in the operation of the second member 42, air entering into the second shaft 46 will immediately enter into the second body 50 and be expelled from the second body 50 to impinge the sheet 16. Furthermore, air will also be expelled from the second body 48 via the orifices 64 (same as 32 and as described for the first member 20) creating the air bearing between the second body 50 and the second cup 48 such that the second body 50 can pivot about the second cup 48.

To measure the thickness of the sheet 16, transmitters and receivers, such as those disclosed in U.S. Pat. No. 4,107,606 may be placed in the first dome 28 and the second dome, respectively. Linear displacement transducers sensing the positions of the first and second hollow shafts 22 and 46 respectively may also be used.

There are many advantages to the apparatus and method of the present invention. First, because the first member 20 and the second member 42 are adjustable, they may be adjusted to accommodate the measurement of the thickness of the sheet 16 over a wide range of values. Secondly, to ensure that the measurement of the thickness of the sheet 16 would be accurate and reliable, free from friction or stiction, first air ring bearings 38 and third air ring bearings 44 are provided. Thirdly, the reduction in friction or stiction as a result of the air bearings 38 and 44 also decreases the chance that the measurement of the sheet 16 may be based upon a compressed sheet 16-sheet 16 being compressed as a result of stiction or friction. Finally, the use of first and second bodies 28 and 50 each of which is capable of being pivoted about a point, ensures that the measurement of a "wobbling" sheet may be made accurately. With the point of pivot on a surface closer to the body (28 or 50) the body (29 or 50) will have a great degree of flexibility in tracking and maintaining a constant distance from the sheet 16.

The theoretical basis for the invention is as follows. It has been found that the force needed to maintain the first member 20 (or second member 42) at a distance from the sheet 16 is $$F = KA \left( \frac{\eta}{\sqrt{p}} \right) \frac{\sqrt{p} \, d^2}{h^3}$$

where:
F = weight of first member 20 or the force through the first shaft 22,
K = constant
A = area of first flat cover 30
$\eta$ = air viscosity through the first shaft 22
$\rho$ = air density through the first shaft 22
p = air pressure through the first shaft 22
d = diameter of orifices 34
h = float height (distance of the first member 20 from the sheet 16)
alternatively:

$$h = \sqrt[3]{KA\left(\frac{\eta}{\sqrt{\rho}}\right)\frac{\sqrt{p}\, d^2}{F}}$$

Of course, the foregoing is equally true for the second member 42.

What is claimed is:

1. An apparatus for measurement of the thickness of a sheet having a portion of said apparatus to one side of said sheet and another portion of said apparatus to the other side of said sheet comprising:
   a housing;
   a member coupled to said housing capable of being extended in a direction substantially perpendicular to the sheet, said member including:
   (i) a hollow shaft positioned to extend in the direction substantially perpendicular to the sheet;
   (ii) a cup, connected to one end of said shaft which is closer to the sheet, and with the concavity of the cup facing the sheet;
   (iii) said cup having a hole in line with the hollow portion of the shaft;
   (iv) a body comprising a dome and a flat cover with the flat cover covering the opening of the dome, said body having an opening in said dome near the apex, a plurality of outlets in said dome and a plurality of orifices in the flat cover;
   (v) means for pivotally attaching said body to said cup such that the dome of said body is inside the cup; and
   fluid means capable of directing fluid through said member.

2. The apparatus of claim 1 wherein said cup and said dome of said body are concentrically shaped.

3. The apparatus of claim 2 wherein said cup has a radius of curvature.

4. The apparatus of claim 3 wherein said fluid means is an air ring bearing.

5. A method of operating an air bearing caliper gauge for measurement of the thickness of a sheet wherein said gauge has a member adjustable to extend in a direction substantially perpendicular to the sheet, a body near one end of said member which is closer to the sheet, said body capable of pivoting about a point, and means for introducing air through said body to impinge said sheet, said method comprising:
   extending said member in the direction of said sheet;
   introducing air through said body to impinge said sheet to lift said body from said sheet; and
   lifting said body from said sheet until the distance between the body and the sheet is such that the point of pivot is substantially at a surface of said sheet, which is closer to said body.

6. The method of claim 5 further comprising the step of directing fluid to impinge said member in a substantially omnidirection which is substantially perpendicular to the direction of extension of said member.

* * * * *